Figure 1:
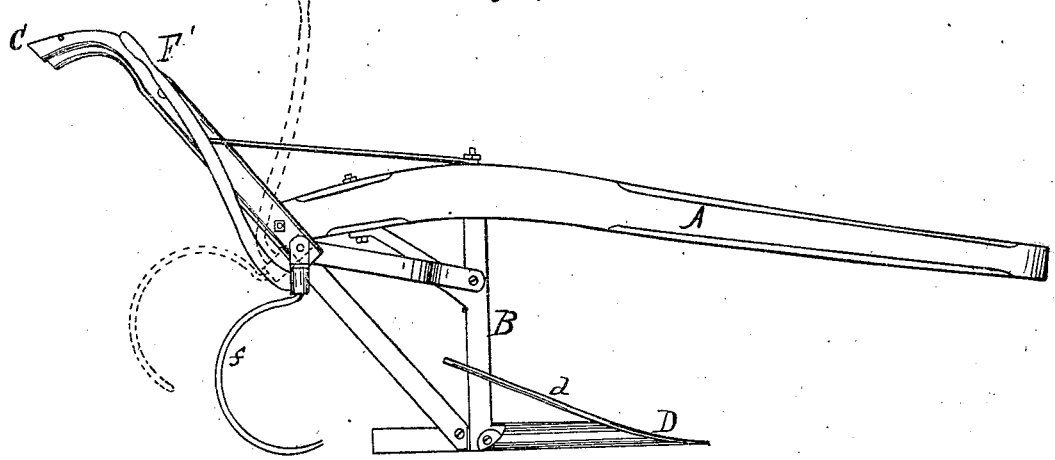

J. A. & T. Wood.
Bean Harvester.
№ 113125. Patented Mar. 28, 1871.

Witnesses:
S. G. Noyes
E. A. Clarkson

Inventor
J. A. and T. Wood.
by H. W. Beadle
their Attorney.

United States Patent Office.

JACOB A. WOOD AND THOMAS WOOD, OF CHEMUNG, ILLINOIS.

Letters Patent No. 113,125, dated March 28, 1871.

IMPROVEMENT IN BEAN-HARVESTERS.

The Schedule referred to in these Letters Patent and making part of the same.

To all whom it may concern:

Be it known that we, JACOB A. WOOD and THOMAS WOOD, of Chemung, in the county of McHenry and State of Illinois, have invented a new and useful Improvement in Bean-Harvesters; and we do hereby declare that the following is a full and exact description of the same, reference being had to the accompanying drawing and to the letters of reference marked thereon.

This invention has for its object the production of an improved implement for harvesting beans and other similar products, which shall be capable of cutting and gathering the vines at one operation, the same being deposited in convenient heaps for loading; and to that end—

It consists in the construction of the various parts, and their combination with each other.

In the drawing—

Figure 1 represents a side elevation, and

Figure 2:
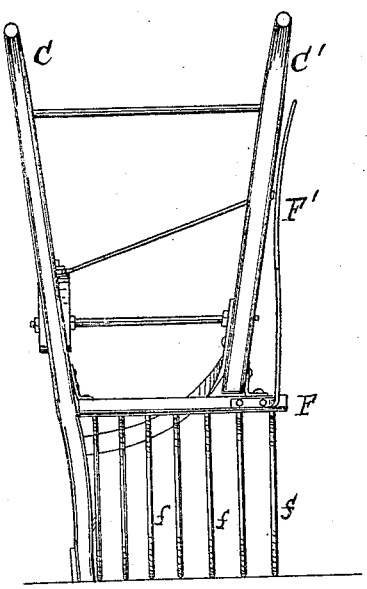

Figure 2, a rear elevation of our improved machine.

To enable others skilled in the art to make and use our invention, we will now proceed to describe fully its construction and operation.

A represents an ordinary plow-beam;

B represents the standard; and

C C', the handles.

These parts may be constructed in any suitable manner.

Figure 3:
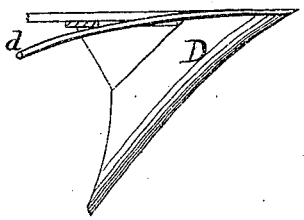

D represents the share or "lay," consisting of a blade, which, in shape, forms, with the land-side, a right-angled triangle, as shown in Figure 3.

It is provided with a rod, d, securely welded thereto. The edge of the lay is confined between this and the land-side, the front end of which forms the point, and the rear end, extending beyond the share, forms a guide to direct the vines to the rake.

It will be observed that the surface line of the share is but slightly inclined from the horizontal, it being designed to cut the vines, simply and slightly raise them, and not to invert them.

E represents a plate, by means of which the lay and land-side are connected. It serves as a brace, and also facilitates the movement of the vines to the rear.

F represents the rake-head, which is hinged or pivoted to the handles in any proper manner that will permit the necessary swinging movement.

It is provided with the lever F', by means of which it is operated.

ff represent the gathering-teeth.

The operation is as follows:

The machine is drawn by a team along the row of the crop, the draft being so arranged that the top of the hill is cut off. The vines, being thus undermined, fall over on the lay, and are caught by the rake.

When a sufficient number is gathered the lever is operated and the load deposited. The heaps thus made can be readily loaded into any proper conveyance and transported to any desired point.

Although the implement is extremely simple in all its parts, it is efficient in its action, and saves the greater part of the labor otherwise necessarily bestowed upon crops of this description.

Having thus fully described our invention,

What we claim as new, and desire to secure by Letters Patent, is—

1. In a bean-harvester, of the construction shown and described, the arrangement of the standard B, share or cutter D, slightly inclined on one side, and the rod d attached thereto and bent and operating all as set forth.

2. In a bean-harvester, thus provided with cutter D on one side of standard B, and provided further with rod d, the rake arranged to swing on the bar F, and operated by handle F', all as set forth.

This specification signed and witnessed this 15th day of November, 1868.

JACOB A. WOOD.
THOMAS WOOD.

Witnesses:
W. G. BILLINGS,
F. R. BILLINGS.